UNITED STATES PATENT OFFICE.

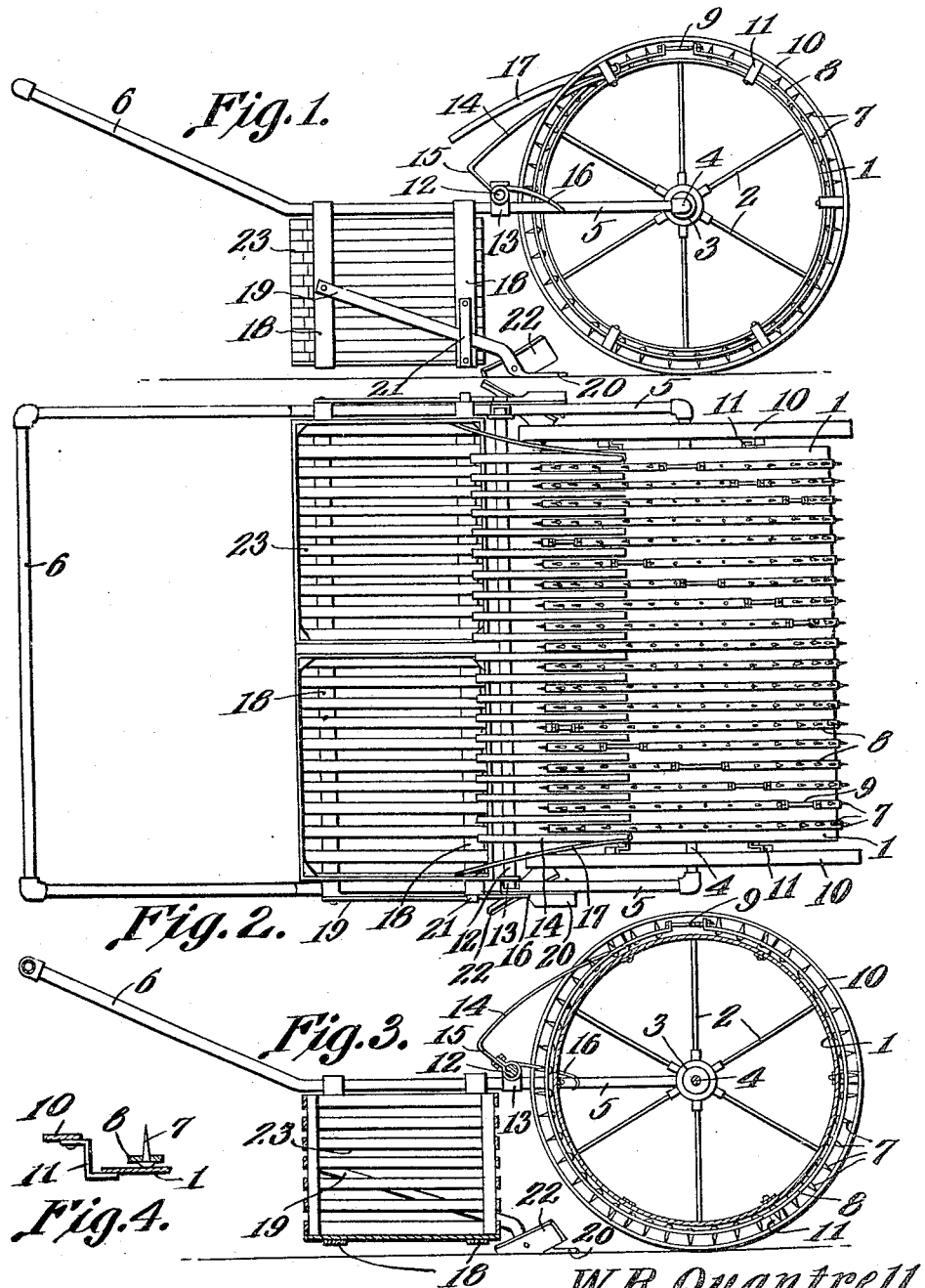

WILLIAM R. QUANTRELL, OF CHARLOTTE, MICHIGAN.

FRUIT-GATHERER.

1,122,802.

Specification of Letters Patent.

Patented Dec. 29, 1914.

Application filed April 12, 1913. Serial No. 760,764.

*To all whom it may concern:*

Be it known that I, WILLIAM R. QUANTRELL, a citizen of the United States, residing at Charlotte, in the county of Eaton and State of Michigan, have invented a new and useful Fruit-Gatherer, of which the following is a specification.

The present invention appertains to a device for gathering fruit, and aims to provide a novel and improved appliance of that character.

It is the object of the present invention to provide a device of the nature indicated which may be run over the soil to pick up the fruit laying thereon and operable to gather the fruit within a suitable receptacle or receptacles carried by the device.

The present invention also comprehends the provision of a device of the character indicated which shall be so constructed and operable to succesfully meet the demands necessary in a device of the character indicated.

With the foregoing general objects outlined and with other objects in view, which will be apparent as the nature of the invention is better understood, the present invention resides in the combination and arrangement of parts and in the details of construction hereinafter described and claimed, it being understood that changes in the precise embodiment of the invention can be made within the scope of what is claimed without departing from the spirit of the invention.

The preferred embodiment of the invention has been illustrated in the accompanying drawing, wherein:—

Figure 1 is a side elevation of the improved gatherer. Fig. 2 is a plan view thereof. Fig. 3 is a longitudinal vertical section. Fig. 4 is a sectional detail.

In carrying out the invention, reference being had in details to the drawings, there are provided a plurality of drums, in this case two, which have been indicated by the numeral 1, each of the drums being provided with the spokes 2 secured to a hub 3, and the hubs being journaled on an axle 4 so that the adjoining edges of the respective drums 1 are in close proximity. The drums as a whole, are therefore in the form of a single drum, split intermediate its ends to permit the drum to traverse the soil in a curvilinear path in an easy manner.

Forwardly projecting thills 5 are attached to the ends of the axle 4 and have their forward ends upturned or deflected upwardly and united by a cross bar to provide a handle 6 for conveniently drawing or pulling the device about. The thills and axle are preferably constructed of tubular stock, such as gas piping, although this is not essential.

To the periphery of each of the drums 1 there are secured numerous teeth or spurs 7 which cover the entire exterior surface of the drums and which are so distributed or closely arranged as to engage any fruit lying on the soil and over which the drums pass. In securing the teeth 7 to the drums, a plurality of bands 8 are mounted on the drums, the bands being spaced apart and being parallel to each other. The teeth 7 are headed or in the form of nails, the teeth engaging through apertures in the bands with their heads clamped between the bands and the drums, so that their tips are free and project outwardly or radially to engage the fruit. In this manner, a plurality of annular series of teeth are provided, the respective series being closely arranged. The bands 8 are preferably split at one point in order to facilitate their engagement to the drums, the ends of the bands being connected by draft bolts 9 in order to clamp the bands in position.

When the device is to be employed on soft soil, or soil which has been cultivated, wheel rims 10 are preferably secured to the remote ends of the drums by means of brackets or stub spokes 11, so that the rims 10 may engage the soil to properly support the drums 1 above the soil. The rims 10 are of a diameter slightly larger than that of the drums 1, so that the teeth 7 may not be pressed into the soft soil due to the weight of the apparatus. The rims 10, however, may be eliminated when the device is to be employed on hard soil, or soil which is capable of supporting the device without permitting the teeth 7 to engage excessively thereinto.

A cross shaft 12 is journaled on the thills 5 by means of the bearings 13 carried by the thills directly in advance of the drums 1, and stripping fingers 14 are attached to the shaft 12 and have their free ends or tips engaging the top of the drums 1 between the bands 8. The fingers 14 are preferably constructed of strips of metal and have their butt ends provided with the angular portions 15 secured rigidly to the shaft 12, wire springs 16 being attached to the ends of the shaft 12 and engaging the thills 5 to press the tips of the fingers 14 against the drums 1. It will thus be noted that the tips of the stripping fingers 14 engage the drums between the respective series of teeth, the butt ends of the stripping fingers extending away from the peripheries of the drum. The endmost stripping fingers 14 have the integral guards 17 attached to their tips and projecting forwardly above the endmost fingers 14 to guide the fruit down the stripping fingers 14 so as to prevent the fruit from rolling off the sides.

A pair of U-shaped hangers 18 are terminally secured to the respective thills 5 in advance of the shaft 12, and bars 19 are pivoted to the arms of the forward hanger 18, the rear ends of the arms being formed into runners 20 adapted to ride on the soil.

Guides 21 are secured to the arms of the rear hanger 18, and pass over the bars 19 to guide them for vertical movements, so that as the thills 5 are raised and lowered, the runners 20 may always engage the soil. in advance of the runners 20, deflectors 22 are secured to the bars 19, the deflectors lying in the paths of the wheel rims 10 to direct the fruit inwardly, which lies in advance of the wheel rims, in order that the rims may not crush the fruit.

The hangers 18 are adapted to support a receptacle or receptacles, which, as shown, are in the form of crates 23. These crates being seated within the hangers 18 have their rear sides disposed below the butt ends of the stripping fingers 14 so that the crates will receive the fruit from the fingers 14.

In operation, an operator may readily draw or pull the device about by means of the handle 6, the drums 1 traveling or running upon the soil so that the teeth 7 engage or bite the fruit. Thus, as the device is drawn forwardly, the fruit will be engaged by the teeth 7 and will cling to the drums, and as the fruit is carried up over the top of the drums, the fingers will strip the fruit from the drums, and as a consequence, the fruit will roll into the crates 23. As soon as the crates have become filled, they may be removed and replaced by empty crates or receptacles in order that the operation may be continued. The two drums 1 permit the device to be readily drawn about a tree, or in a curved path, and it will be noted that when the rims are employed, as in connection with soft soil, the deflectors 22 direct the fruit inwardly which lies in the paths of the rims 10. If the rims 10 are not employed, the bars 19 and deflectors may be eliminated as will be apparent. The springs 16 tend to maintain the free ends of the stripping fingers 14 properly in engagement with the drums so that the proper operation of the device will ensue at all times.

From the foregoing taken in connection with the drawing, the advantages and capabilities of the present device will be apparent to those versed in the art, it being noted that the objects aimed at have been carried out satisfactorily, and that the present device provides a desirable one for the purposes for which it is designed.

Having thus described the invention, what is claimed as new is:—

1. In a device of the character described, a frame, a drum carried thereby having fruit engaging teeth, soil engaging rims secured to the remote ends of the drum, the frame including receptacle holding means, stripping means carried by the frame coöperating with the drum, runners connected with the frame and adapted to ride on the soil, and deflectors carried by the runners in advance of the rims to direct the fruit inwardly.

2. In a device of the character described, a frame, a drum carried thereby and having fruit engaging teeth, receptacle supporting means carried by the frame, stripping fingers carried by the frame and coöperating with the drum, soil engaging rims secured to the remote ends of the drum, bars pivoted to the frame and having their free ends formed into runners, and deflectors carried by the bars in advance of the rims for directing the fruit inwardly.

3. In a device of the character described, an axle, a pair of drums mounted thereon and having fruit engaging teeth, thills attached to the ends of the axle, a spring pressed shaft carried by the thill, stripping fingers secured to the shaft coöperating with the drums, soil engaging rims attached to the remote ends of the drums, receptacle supporting hangers attached to the thills, members pivoted to the front hanger and having runners at their rear ends to engage the soil, guides for the said members carried by the rear hanger, and deflectors carried by the said members in advance of the rims to direct the fruit inwardly.

In testimony that I claim the foregoing as my own, I have hereto affixed my signature in the presence of two witnesses.

WILL. R. QUANTRELL.

Witnesses:
 VICTOR C. ROBLIN.
 JAS H. BROWN.